United States Patent
Bose et al.

(10) Patent No.: US 9,645,935 B2
(45) Date of Patent: May 9, 2017

(54) INTELLIGENT BANDWIDTH SHIFTING MECHANISM

(71) Applicant: International Business Machines Corporation, Armonk, NY (US)

(72) Inventors: Pradip Bose, Yorktown Heights, NY (US); Alper Buyuktosunoglu, White Plains, NY (US); Victor Javier Jimenez Perez, White Plains, NY (US); Francis P. O'Connell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 14/595,737

(22) Filed: Jan. 13, 2015

(65) Prior Publication Data

US 2016/0253264 A1   Sep. 1, 2016

(51) Int. Cl.
| | | |
|---|---|---|
| G06F 12/00 | (2006.01) | |
| G06F 12/0862 | (2016.01) | |
| G06F 9/46 | (2006.01) | |
| G06F 11/30 | (2006.01) | |

(52) U.S. Cl.
CPC ............ *G06F 12/0862* (2013.01); *G06F 9/46* (2013.01); *G06F 11/30* (2013.01); *G06F 2212/602* (2013.01)

(58) Field of Classification Search
CPC ............... G06F 12/0862; G06F 9/3009; G06F 9/30047; G06F 2212/602
See application file for complete search history.

(56) References Cited

U.S. PATENT DOCUMENTS

| | | | |
|---|---|---|---|
| 8,624,966 B2* | 1/2014 | Ozawa | A61B 1/00057 348/68 |
| 9,092,236 B1* | 7/2015 | Jung | G06F 8/4442 |
| 2005/0071572 A1* | 3/2005 | Nakashima | G06F 8/4442 711/137 |
| 2005/0138627 A1* | 6/2005 | Bradford | G06F 9/463 718/107 |
| 2005/0138628 A1* | 6/2005 | Bradford | G06F 9/3802 718/107 |
| 2006/0224860 A1* | 10/2006 | Colavin | G06F 9/383 712/207 |
| 2007/0094453 A1* | 4/2007 | Santhanakrishnan | G06F 9/383 711/137 |

(Continued)

OTHER PUBLICATIONS

Byun, Jong-Ho, et al.; "Performance analysis of coarse-grained parallel genetic algorithms on the multi-core Sun UltraSPARC T1"; IEEE Southeast Conference 2009; 6 pp.; IEEE; 2009.

(Continued)

*Primary Examiner* — John A Lane
(74) *Attorney, Agent, or Firm* — Edward J. Wixted, III

(57) ABSTRACT

In an approach for sharing memory bandwidth in one or more processors, a processor receives a first set of monitored usage information for one or more processors executing one or more threads. A processor calculates impact of hardware data prefetching for each thread of the one or more threads, based on the first set of monitored usage information. A processor adjusts prefetch settings for the one or more threads, based on the calculated impact of hardware data prefetching for each thread of the one or more threads.

17 Claims, 3 Drawing Sheets

(56) References Cited

U.S. PATENT DOCUMENTS

| | | | |
|---|---|---|---|
| 2007/0113055 A1* | 5/2007 | Dale | G06F 9/3824 712/228 |
| 2008/0028154 A1 | 1/2008 | Hoover et al. | |
| 2008/0263257 A1* | 10/2008 | Cain, III | G06F 12/0862 711/3 |
| 2009/0055399 A1* | 2/2009 | Lu | G06F 17/30132 |
| 2009/0138683 A1* | 5/2009 | Capps, Jr. | G06F 9/30101 712/220 |
| 2009/0248976 A1 | 10/2009 | Rotithor | |
| 2009/0300340 A1* | 12/2009 | Chou | G06F 9/3806 712/237 |
| 2010/0268893 A1* | 10/2010 | Luttrell | G06F 12/0862 711/137 |
| 2011/0093687 A1* | 4/2011 | Chen | G06F 12/0862 712/225 |
| 2011/0093838 A1* | 4/2011 | Archambault | G06F 8/443 717/158 |
| 2011/0113199 A1 | 5/2011 | Tang et al. | |
| 2011/0296431 A1* | 12/2011 | Gschwind | G06F 9/544 719/310 |
| 2012/0066455 A1* | 3/2012 | Punyamurtula | G06F 12/0862 711/122 |
| 2012/0226892 A1* | 9/2012 | Tirumalai | G06F 9/3851 712/207 |
| 2013/0262826 A1 | 10/2013 | Gendler et al. | |
| 2014/0108740 A1* | 4/2014 | Rafacz | G06F 12/0862 711/137 |
| 2014/0115569 A1* | 4/2014 | Jung | G06F 8/4432 717/160 |
| 2014/0281352 A1* | 9/2014 | Venkatsubramanian | G06F 12/1027 711/205 |
| 2015/0254078 A1* | 9/2015 | Desai | G06F 9/3802 712/207 |
| 2016/0034400 A1* | 2/2016 | Dale | G06F 12/0862 711/122 |

OTHER PUBLICATIONS

Ebrahimi, Eiman, et al.; "Coordinated Control of Multiple Prefetchers in Multi-Core Systems"; MICRO 42 Proceedings of the 42nd Annual IEEE/ACM International Symposium on Microarchitecture; 2009; <http://dl.acm.org/citation.cfm?id=1669154>; Printed Aug. 5, 2014.

Ebrahimi, Eiman, et al.; "Prefetch-Aware Shared Resource Management for Multi-Core Systems"; ISCA '11 Proceedings of the 38th Annual International Symposium on Computer architecture; 2011; <http://dl.acm.org/citation.cfm?id=2000081>; Printed Aug. 5, 2014.

IBM; "An Approach for the Efficient Administration and Scheduling of Computational Kernels on Cell BE Multi-Core Processors—SPE Kernel Chaining"; An IP.com Prior Art Database Technical Disclosure; <http://ip.com/IPCOM/000181499D>; Published on Apr. 3, 2009.

Lee, Chang Joo, et al.; "Prefetch-Aware Memory Controllers"; IEEE Transactions on Computers; Oct. 2011; vol. 60; No. 10; <http://www.computer.org/csdl/trans/tc/2011/10/ttc2011101406-abs.html>; Printed Aug. 5, 2014.

Shah, Manish, et al.; "UltraSPARC T2. a highly-threaded, power-efficient, SPARC SOC"; 2007 IEEE Asian Solid-State Circuits Conference; pp. 22-25, IEEE; 2007.

Srinath, Santhosh, et al.; "Feedback Directed Prefetching: Imroving the Performance and Bandwidth-Efficiency of Hardware Prefetchers"; HPCA '07 Proceedings of the 2007 IEEE 13th International Symposium on High Performance Computer;<http://dl.acm.org/citation.cfm?id=1318101>; Printed Aug. 5, 2014.

"Trace-Core Processors"; An IP.com Prior Art Database Technical Disclosure; <http://ip.com/IPCOM/000199882D>; Sep. 20, 2010.

* cited by examiner

INTELLIGENT BANDWIDTH SHIFTING MECHANISM

STATEMENT REGARDING FEDERALLY SPONSORED RESEARCH OR DEVELOPMENT

This invention was made with Government support under Contract #HR0011-13-C-0022 awarded by Defense Advanced Research Projects Agency (DARPA). The Government has certain rights to this invention.

BACKGROUND OF THE INVENTION

The present invention relates generally to the field of data prefetching, and more particularly to assigning prefetch resources to threads running on a multi-core system, thus controlling bandwidth allocation to each different thread.

In computer architecture, instruction prefetch is a technique used in microprocessors to speed up the execution of a program by reducing wait states. Modern microprocessors are much faster than the memory where the program is kept, meaning that the program's instructions cannot be read fast enough from memory to keep the microprocessor busy. Adding a cache can provide faster access to needed instructions.

Prefetching occurs when a processor requests instructions or data from main memory before the instructions or data are actually needed. Once the instructions or data come back from memory, the instructions or data are placed in a cache. When instructions or data are actually needed, the instructions or data can be accessed much more quickly from the cache than if the processor had to make a request from memory.

Since program instructions are generally executed sequentially, performance is likely to be best when instructions are prefetched in order. Alternatively, the prefetch may be part of a complex branch prediction algorithm, where the processor tries to anticipate the result of a calculation and fetch the right instructions in advance. In the case of data prefetching, the prefetcher can take advantage of spatial locality usually found in most applications.

SUMMARY

Aspects of an embodiment of the present invention disclose a method, computer program product, and computing system for sharing memory bandwidth in one or more processors. A processor receives a first set of monitored usage information for one or more processors executing one or more threads. A processor calculates impact of hardware data prefetching for each thread of the one or more threads, based on the first set of monitored usage information. A processor adjusts prefetch settings for the one or more threads, based on the calculated impact of hardware data prefetching for each thread of the one or more threads.

DETAILED DESCRIPTION

While data prefetching typically helps performance, the speculative nature of data prefetching is sometimes inaccurate, bringing unneeded data from the memory into the processor's caches. When such unnecessary data prefetching happens, memory bandwidth is wasted, and cache pollution may occur. This problem is exacerbated when a processor supports the simultaneous execution of multiple threads. In such a scenario, even without the presence of data prefetching, bandwidth may already be saturated. Embodiments of the present invention recognize that enabling data prefetch in such a case may degrade system performance, due to demand loads on available bandwidth.

Embodiments of the present invention recognize that the efficiency of data prefetching depends on the algorithm used by the prefetcher and the characteristics of the applications running on the system. Embodiments of the present invention recognize that some applications present memory access patterns that are amenable to accurate prefetching, while other applications contain nearly random access patterns, for which no prefetcher can be reasonably accurate. Because of the different impact of data prefetching on applications running on the system, and especially under a constrained bandwidth scenario, embodiments of the present invention recognize that it is necessary to intelligently allocate prefetching resources to the applications. Such an approach aims to maximize the utilization of memory bandwidth, potentially improving system performance and/or reducing power consumption (e.g., by disabling or altering the prefetcher for applications that are not amenable to prefetching).

Embodiments of the present invention recognize that disabling or altering prefetch for a thread with a lower prefetch usefulness does not always guarantee an effective increase in system performance. In embodiments of the present invention, an approach is used for assigning prefetch resources to threads running on a multi-core system, and for controlling bandwidth allocation to said threads.

Embodiments of the present invention will now be described in detail with reference to the Figures.

Figure 1:
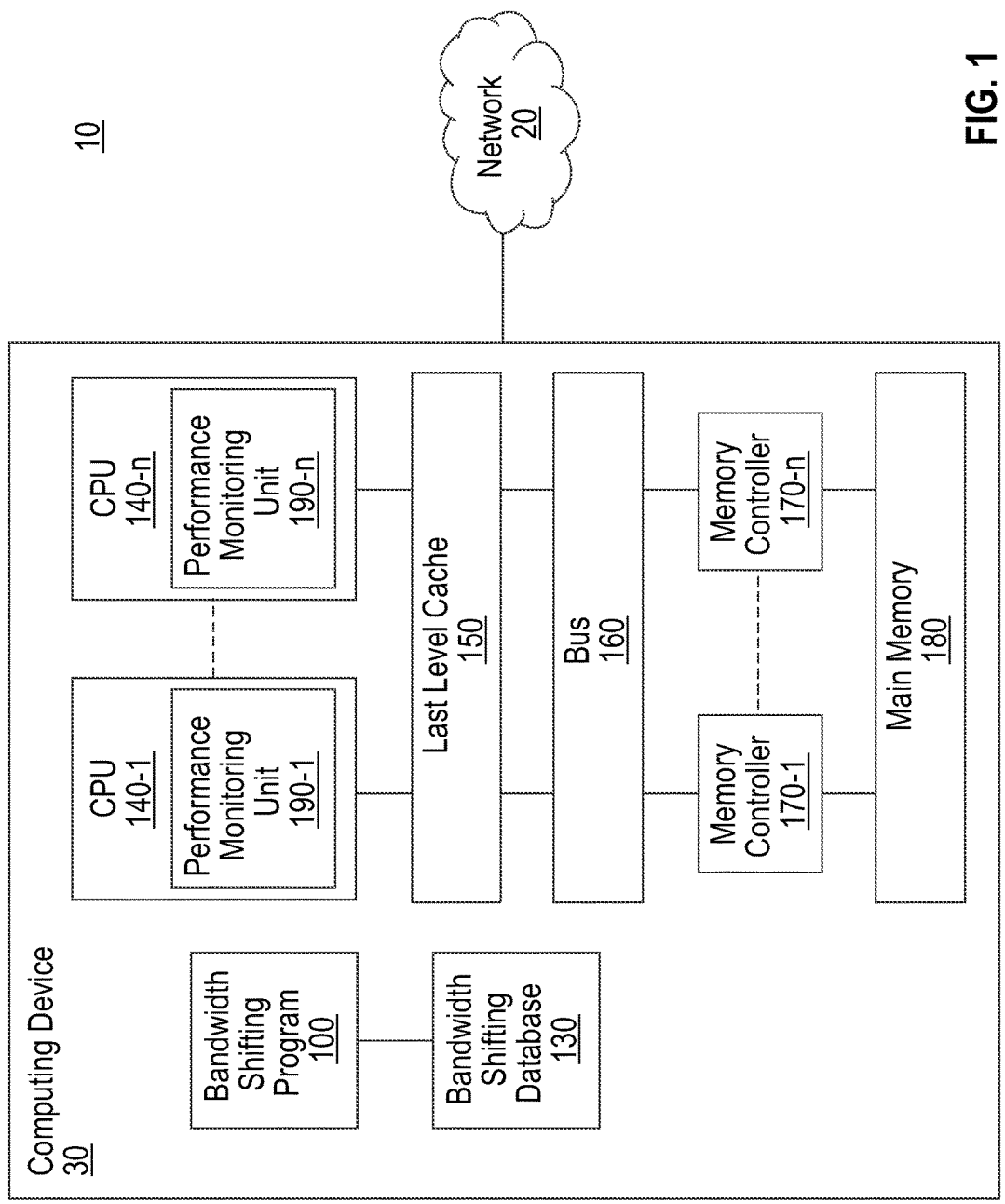
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computer processing unit (CPU) 140, performance monitoring unit 190, and memory controller 170 are labeled as "1-n." This labeling is to signify there can be one CPU 140, performance monitoring unit 190, and memory controller 170 or any number of CPU 140, performance monitoring unit 190, and memory controller 170. Hereafter, CPU 140, performance monitoring unit 190, and memory controller 170 will signify any one specific CPU, performance monitoring unit, and memory controller within the collective CPU 140, performance monitoring unit 190, and memory controller 170, respectively, "1-n."

In the depicted embodiment, computing system 10 includes computing device 30. In some embodiments, computing system 10 can send and receive information over network 20. Network 20 may be a local area network (LAN), a wide area network (WAN) such as the Internet, a cellular data network, any combination thereof, or any combination of connections and protocols that will support communications between computing device 30 and other computing devices that may send information to computing device 30 or receive information from computing device 30, in accordance with embodiments of the invention. Network 20 may include wired, wireless, or fiber optic connections. Computing system 10 may include additional computing devices, servers, or other devices not shown.

Computing device 30 may be a management server, a web server, or any other electronic device or computing system capable of processing program instructions and receiving and sending data. In some embodiments, computing device 30 may be a laptop computer, tablet computer, netbook computer, personal computer (PC), a desktop computer, or any programmable electronic device capable of communicating with another computing device via network 20. In other embodiments, computing device 30 may represent a server computing system utilizing multiple computers as a server system, such as in a cloud computing environment. In another embodiment, computing device 30 represents a computing system utilizing clustered computers and components to act as a single pool of seamless resources. Computing device 30 contains bandwidth shifting program 100, bandwidth shifting database 130, CPU 140, last level cache 150, bus 160, memory controller 170, main memory 180, and performance monitoring unit 190. Computing device 30 may include components, as depicted and described in further detail with respect to FIG. 3.

Bandwidth shifting program 100 operates to retrieve data, such as data stored to bandwidth shifting database 130, and to assign prefetch resources to threads running on the system—thus controlling the bandwidth allocation to the different threads. In some embodiments, bandwidth shifting program 100 resides on a multi-core system. Prefetch usefulness refers to the impact that hardware data prefetching has on a given thread, as determined by computed metrics in a given system. In some embodiments, bandwidth shifting program 100 retrieves system data (e.g., bandwidth consumption, system performance, and instructions completed per cycle) directly from performance monitoring unit 190. Bandwidth shifting program 100 uses the system data to determine whether or not a given thread should prefetch data. Bandwidth shifting program 100 compares when prefetching is done to when no prefetching is done to determine whether or not a given thread should prefetch data. In other embodiments, bandwidth shifting program 100 retrieves system data from bandwidth shifting database 130 or any other repository capable of being read by bandwidth shifting program 100. In general, bandwidth shifting program 100 identifies threads that should or should not be prefetching data based on the efficiency of each thread, as well as the overall efficiency of computing device 30. Bandwidth shifting program 100 enables, disables, alters such prefetching, or, otherwise, determines where to direct prefetch resources. In the depicted embodiment, bandwidth shifting program 100 resides on computing device 30. In other embodiments, bandwidth shifting program 100 may reside on another computing device, provided bandwidth shifting program 100 is capable of accessing bandwidth shifting database 130 and performance monitoring unit 190.

Bandwidth shifting database 130 may be a repository that may be written to by bandwidth shifting program 100 and performance monitoring unit 190 and read by bandwidth shifting program 100. In one embodiment, bandwidth shifting program 100 writes data relevant to multiple events occurring in computing device 30 and to the impact that hardware data prefetching has on a given thread directly to bandwidth shifting database 130. In other embodiments, performance monitoring unit 190 writes data relevant to multiple events occurring in computing device 30 and to the impact that hardware data prefetching has on a given thread directly to bandwidth shifting database 130. In some embodiments, data relevant to multiple events occurring in computing device 30 may be stored to bandwidth shifting database 130. In some embodiments, data relevant to the impact that hardware data prefetching has on a given thread may be stored to bandwidth shifting database 130. For example, data relevant to multiple events occurring in computing device 30 and to the impact that hardware data prefetching has on a given thread may include: bandwidth consumption, system performance, and/or instructions completed per cycle. Additionally, alternative measurements can be used to assess the prefetch usefulness of the threads running on the system. The data relevant to the impact that hardware data prefetching has on a given thread will be compared to the same data (i.e., bandwidth consumption, system performance, and/or instructions completed per cycle) when there is no prefetching. In some embodiments, calculations of the prefetch usefulness will be stored to bandwidth shifting database 130. For example, prefetch usefulness (PU) may be defined as: $PU=(IPC\_on/BW\_on)/(IPC\_off/BW\_off)$ where IPC_on and IPC_off are instructions completed per cycle when the prefetch is enabled and disabled, respectively. Similarly, BW_on and BW_off refer to the memory bandwidth consumption when the prefetch is enabled and disabled, respectively. In other examples, prefetch usefulness may be defined by any other equation that measures the impact that hardware data prefetching has on a given thread. In some embodiments, other equations may be used that would cause bandwidth shifting program 100 to alter the prefetch on a given thread. In general, bandwidth shifting database 130 may be any database capable of being monitored and accessed by bandwidth shifting program 100 and performance monitoring unit 190.

CPU 140 is the hardware within a computer that carries out the instructions of a computer program, such as bandwidth shifting program 100, by performing the basic arithmetical, logical, and input/output (I/O) operations of the system. A computer can have more than one CPU; this is called multiprocessing. Modern CPUs are typically microprocessors, meaning contained on a single chip. Some integrated circuits (ICs) contain multiple CPUs on a single chip and are commonly referred to as multi-core processors. In some embodiments, computing device 30 contains one CPU 140. In other embodiments, computing device 30 contains multiple CPU 140s—depicted in FIG. 1 as CPU 140-1 through 140-n. Each CPU 140 has access to a particular piece of last level cache 150.

In one embodiment, performance monitoring unit 190 is a special-purpose register built into CPU 140 to monitor and store the counts of hardware-related activities within computing device 30. In other embodiments, performance monitoring unit 190 is not built into CPU 140. Each performance monitoring unit 190 can be programmed with the index of one or more event types to be monitored and measured, such as, for example, executed instructions, cache misses, branch mispredictions, and prefetch-related events. Executed instructions involve a process by which a computer retrieves a program instruction from its memory, determines what actions the instruction requires, and carries out the determined actions. A cache miss refers to a failed attempt to read or write a piece of data in the cache, which results in a main memory access with much longer latency. Branch mispredictions occur when a CPU mispredicts the next instruction to process in a digital circuit that tries to guess which way a branch will go before this is known for sure.

In one embodiment, performance monitoring unit 190 interfaces with bandwidth shifting program 100 to allow bandwidth shifting program 100 to access the monitored and measured information. In other embodiments, performance monitoring unit 190 interfaces with bandwidth shifting database 130 to allow bandwidth shifting database 130 to store the monitored and measured information.

Last level cache 150 is a component that transparently stores data so that future requests for that data can be served faster. The data that is stored within a cache might be values that have been computed earlier or duplicates of original values that are stored elsewhere. If requested data is contained in the cache (cache hit), this request can be served by simply reading the cache, which is comparatively faster. Otherwise (cache miss), the data has to be recomputed or fetched from its original storage location, which is comparatively slower. Hence, the greater the number of requests that can be served from last level cache 150, the faster the overall system performance becomes.

Bus 160 is a communication system that transfers data between components inside a computer, or between computers. In the depicted embodiment of the present invention, bus 160 is a communication system that transfers data between CPU 140 and main memory 180.

Memory controller 170 is a digital circuit which manages the flow of data going to and from main memory 180. In some embodiments, memory controller 170 is a separate chip. In other embodiments, memory controller 170 is integrated into another chip, such as on the die of a microprocessor. Memory controller 170 contains the logic necessary to read and write to main memory 180, and to refresh main memory 180. Without constant refreshes, in some embodiments, main memory 180 will lose the data written to it as the capacitors leak their charge within a fraction of a second. Each memory controller 170 can access any piece of main memory 180.

Main memory 180, or primary memory, is often associated with addressable semiconductor memory. There are two main types of semiconductor memory: volatile and non-volatile. In some embodiments, main memory 180 is volatile. In some embodiments, main memory 180 is non-volatile. An example of non-volatile memory is flash memory. Examples of volatile memory are dynamic random-access memory (DRAM) and static random-access memory (SRAM).

Figure 2:
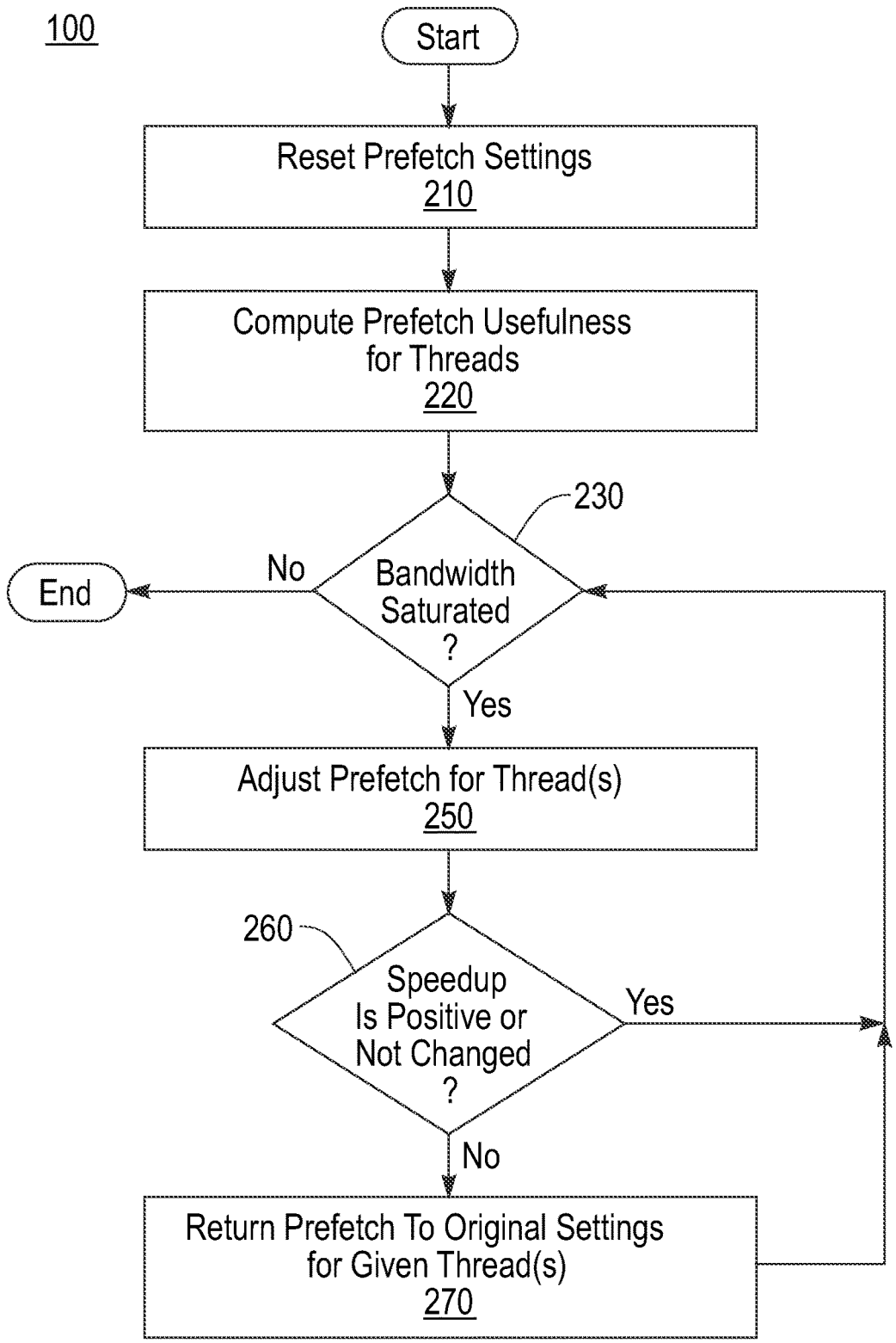
FIG. 2 depicts a flowchart of the steps of a bandwidth shifting program, executing within the computing system of FIG. 1, for assigning prefetch resources to each thread running on a system and controlling the bandwidth allocation to each different thread, in accordance with an embodiment of the present invention.

FIG. 2 depicts a flowchart of the steps of a bandwidth shifting program, executing within the computing system of FIG. 1, in accordance with an embodiment of the present invention. Bandwidth shifting program 100 operates to assign prefetch resources to threads running on computing device 30, thus controlling bandwidth allocation to different threads, in accordance with one embodiment of the present invention.

Performance monitoring unit 190 plays an important role, as it monitors and stores the counts of hardware-related activities within computing device 30. Performance monitoring unit 190 can be programmed with the index of one or more event types to be monitored and measured, such as, for example, executed instructions, cache misses, branch mispredictions, and prefetch-related events.

In step 210, bandwidth shifting program 100 resets the prefetch setting for a predefined number of threads, using a predefined prefetch. By resetting the prefetch setting for a predefined number of threads, bandwidth shifting program 100 creates a baseline, so the threads can be measured equally throughout an entire phase.

In step 220, bandwidth shifting program 100 computes prefetch usefulness for monitored threads, in accordance with one embodiment of the present invention. In some embodiments, bandwidth shifting program 100 retrieves information measured during multiple events occurring on CPU 140 in computing device 30.

In some embodiments, bandwidth shifting program 100 retrieves the information needed for computing from bandwidth shifting database 130. In some embodiments, bandwidth shifting program 100 retrieves the information needed for computing directly from performance monitoring unit 190.

Bandwidth shifting program 100 estimates the impact that hardware data prefetching has on a given thread by computing the prefetch usefulness (PU) of the threads. In some embodiments, prefetch usefulness (PU) is defined as: $PU=(IPC\_on/BW\_on)/(IPC\_off/BW\_off)$ where IPC_on and IPC_off are instructions completed per cycle when the prefetch is enabled and disabled, respectively. Similarly, BW_on and BW_off refer to the memory bandwidth consumption when the prefetch is enabled and disabled, respectively. In other examples, prefetch usefulness may be defined by any other equation that measures the impact that hardware data prefetching has on a given thread. In some embodiments, other equations may be used that would cause bandwidth shifting program 100 to alter the prefetch on a given thread.

In some embodiments, bandwidth shifting program 100 stores the results from the computations calculated to bandwidth shifting database 130. In some embodiments, the results remain on bandwidth shifting program 100.

In decision 230, bandwidth shifting program 100 determines whether the bandwidth is saturated or whether the bandwidth is not saturated. Bandwidth saturation refers to the point at which available bandwidth is used up. To make the determination of whether or not bandwidth is saturated, in one embodiment, bandwidth shifting program 100 retrieves, from performance monitoring unit 190, monitored information of the total bandwidth consumption in computing device 30. In other embodiments, bandwidth shifting program 100 retrieves monitored information of the total bandwidth consumption in computing device 30 from bandwidth shifting database 130. If bandwidth shifting program 100 determines that the total bandwidth consumption is not saturated (decision 230, no branch), the program is complete until an external program, such as a preset time interval, causes bandwidth shifting program 100 to be executed again. If bandwidth shifting program 100 determines that the total bandwidth consumption is saturated (decision 230, yes branch), bandwidth shifting program 100, in one embodiment, disables prefetch for threads based on preconfigured settings—shifting bandwidth from low to high-efficient threads may improve performance on computing device 30. In other embodiments, bandwidth shifting program 100 alters, or otherwise adjusts, prefetch for threads based on preconfigured settings (step 250).

In some embodiments, not shown in the depicted embodiment, after step 250, bandwidth shifting program 100 determines whether the bandwidth is still saturated (see decision 230). While the bandwidth is still saturated (see decision 230, yes branch), bandwidth shifting program 100 will continue to disable, alter, or otherwise adjust prefetching for remaining running threads, based on the prefetch usefulness associated with the individual threads—in one embodiment, from low to high values. Once bandwidth shifting program 100 determines that the bandwidth is not saturated (see decision 230, no branch), bandwidth shifting program 100 is complete until an external program, such as a preset time interval, causes bandwidth shifting program 100 to be executed again.

Bandwidth shifting program 100 as presented thus far is, in essence, a greedy algorithm. A greedy algorithm is an algorithm that follows the problem solving heuristic of making the locally optimal choice at each stage of the algorithm with the hope of finding a global optimum—the best possible outcome. In many problems, a greedy algorithm does not, in general, produce an optimal solution, but nonetheless a greedy algorithm may yield locally optimal solutions that approximate a global optimal solution in a reasonable time.

Once bandwidth shifting program 100 disables, alters, or otherwise adjusts prefetching for a given thread, bandwidth shifting program 100 does not reevaluate the decision. However, embodiments of the present invention recognize that disabling or altering prefetch for a thread with a lower prefetch usefulness does not always guarantee an effective increase in system performance. For example, in some situations, due to a lack of hardware resources, a thread with a higher PU cannot take over the bandwidth left unused when turning prefetch off for a lower PU thread. Threads running on a system share hardware resources in the memory hierarchy and this limits their individual peak bandwidth (e.g., there is typically a limit on the number of simultaneous prefetch streams that threads can allocate). It is essential to prevent the algorithm from taking a decision that may lead to a system performance decrease.

In some embodiments of the present invention, decision 260 and step 270 alleviate the aforementioned problem. When bandwidth shifting program 100 disables, alters, or otherwise adjusts prefetching for a given thread (see step 250), with the inclusion of decision 260 and step 270, system performance is measured before and after disabling, altering, or otherwise adjusting prefetching for the given thread.

In decision 260, bandwidth shifting program 100 determines whether the speedup is positive (or not changed) or whether the speedup is not positive (or negative). Here, speedup refers to the speed of computing device 30, as well as other types of optimization, including, but not limited to, power usage and individual thread performance. To determine whether speedup is positive (or not changed) or negative, in one embodiment, bandwidth shifting program 100 retrieves, from performance monitoring unit 190, monitored information of the total bandwidth consumption in computing device 30 after disabling, altering, or otherwise adjusting the given thread. In other embodiments, bandwidth shifting program 100 retrieves monitored information of the total bandwidth consumption in computing device 30 after disabling, altering, or otherwise adjusting the given thread from bandwidth shifting database 130. If bandwidth shifting program 100 determines that there is a positive speedup (or not changed), meaning the bandwidth consumption is lower than (or equal to) prior to bandwidth shifting program 100 disabling, altering, or otherwise adjusting the prefetch for the given thread, in the performance of computing device 30 (decision 260, yes branch), bandwidth shifting program 100 allows the prefetching for the given thread to remain disabled, altered, or otherwise adjusted. If bandwidth shifting program 100 determines that there is a negative speedup, meaning the bandwidth consumption is higher than prior to bandwidth shifting program 100 disabling, altering, or otherwise adjusting the prefetch for the given thread, in the performance of computing device 30 (decision 260, no branch), bandwidth shifting program 100 restores prefetch for the previously disabled, altered, or otherwise adjusted thread (step 270).

In step 270, bandwidth shifting program 100 restores prefetching for the given thread. Bandwidth shifting program 100 determines, again, whether the bandwidth is saturated (see decision 230). If bandwidth shifting program 100 determines that the bandwidth is saturated (decision 230, yes branch), bandwidth shifting program 100 proceeds according to steps 250-270, as discussed above. If bandwidth shifting program 100 determines that the bandwidth is not saturated (decision 230, no branch), the program is complete until an external program, such as a preset time interval, causes bandwidth shifting program 100 to be executed again.

The entire algorithm of bandwidth shifting program 100 may run frequently, according to a specified time interval and/or need.

Figure 3:
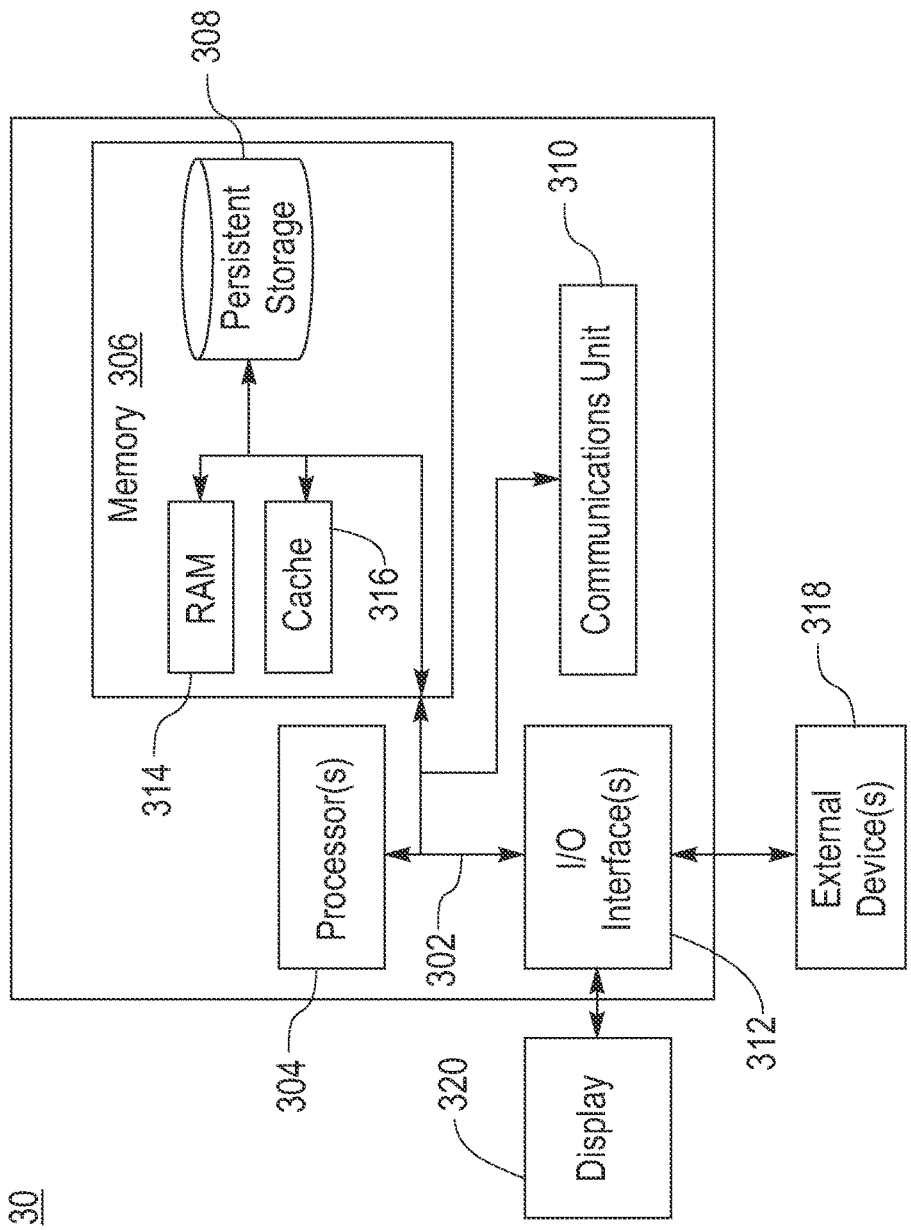
FIG. 3 depicts a block diagram of components of the server and the client computing device, in accordance with an embodiment of the present invention.

FIG. 3 depicts a block diagram of components of computing device 30, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 30 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media.

Bandwidth shifting program 100 and bandwidth shifting database 130 are stored in persistent storage 308 of computing device 30 for execution and/or access by one or more of the respective computer processors 304 of computing device 30 via one or more memories of memory 306 of computing device 30. In this embodiment, persistent storage 308 includes a magnetic hard disk drive. Alternatively, or in addition to magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Bandwidth shifting program 100 and bandwidth shifting database 130 may be downloaded to persistent storage 308 of computing device 30 through communications unit 310 of computing device 30.

I/O interface(s) 312 allows for input and output of data with other devices that may be connected to computing device 30. For example, I/O interface 312 may provide a connection to external device(s) 318, such as keyboard, keypad, a touch screen, and/or some other suitable input device. External device(s) 318 can also include portable computer readable storage media (e.g., thumb drives, portable optical or magnetic disks, and memory cards). Software and data used to practice embodiments of the present invention, e.g., bandwidth shifting program 100 and bandwidth shifting database 130, can be stored on such portable computer readable storage media and can be loaded onto persistent storage 308 of computing device 30 via I/O interface(s) 312 of computing device 30. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for sharing memory bandwidth in one or more processors, the method comprising:
   receiving a first set of monitored usage information for one or more processors executing one or more threads, wherein the first set of monitored usage information comprises at least, for each thread of the one or more threads, instructions completed per cycle when prefetch is enabled, instructions completed per cycle when prefetch is disabled, memory bandwidth consumption when prefetch is enabled, and memory bandwidth consumption when prefetch is disabled;
   calculating impact of hardware data prefetching for each thread of the one or more threads, based on the first set of monitored usage information; and
   adjusting prefetch settings for the one or more threads, based on calculated impact of hardware data prefetching for each thread of the one or more threads.

2. The method of claim 1, wherein the first set of monitored usage information comprises at least, for each thread of the one or more threads, prefetch requests generated and prefetched data utilized; and
   wherein the step of calculating the impact of hardware data prefetching for each thread of the one or more threads is based on at least prefetch requests generated and prefetched data utilized.

3. The method of claim 1, further comprising:
   prior to receiving the first set of monitored usage information, adjusting the prefetch settings for the one or more threads to maximize prefetching for each thread of the one or more threads.

4. The method of claim 1, further comprising:
   receiving a second set of monitored usage information for the one or more processors executing the one or more threads, subsequent to adjusting the prefetch settings for the one or more threads;
   determining that adjusted prefetch settings have a negative effect on the one or more processors executing the one or more threads, based on the second set of monitored usage information; and
   adjusting the prefetch settings for the one or more threads to a previous setting that was already determined and used.

5. The method of claim 1, further comprising:
   determining that memory bandwidth is saturated for the one or more processors executing the one or more threads, based on the first set of monitored usage information.

6. The method of claim 1, further comprising:
   receiving a second set of monitored usage information for the one or more processors executing the one or more threads, subsequent to adjusting the prefetch settings for the one or more threads; and
   determining that the adjusted prefetch settings do not have a negative effect on the one or more processors executing the one or more threads, based on the second set of monitored usage information.

7. A computer program product for sharing memory bandwidth in one or more processors, the computer program product comprising:
   one or more computer readable storage media and program instructions stored on the one or more computer readable storage media, the program instructions comprising:
   program instructions to receive a first set of monitored usage information for one or more processors executing one or more threads, wherein the first set of monitored usage information comprises at least, for each thread of the one or more threads, instructions completed per cycle when prefetch is enabled, instructions completed per cycle when prefetch is disabled, memory bandwidth consumption when prefetch is enabled, and memory bandwidth consumption when prefetch is disabled;
   program instructions to calculate impact of hardware data prefetching for each thread of the one or more threads, based on the first set of monitored usage information; and
   program instructions to adjust prefetch settings for the one or more threads, based on calculated impact of hardware data prefetching for each thread of the one or more threads.

8. The computer program product of claim 7, wherein the first set of monitored usage information comprises at least, for each thread of the one or more threads, prefetch requests generated and prefetched data utilized; and
   wherein program instructions to calculate the impact of hardware data prefetching for each thread of the one or more threads are based on at least prefetch requests generated and prefetched data utilized.

9. The computer program product of claim 7, further comprising:
   program instructions, stored on the one or more computer readable storage media, to, prior to receiving the first set of monitored usage information, adjust the prefetch settings for the one or more threads to maximize prefetching for each thread of the one or more threads.

10. The computer program product of claim 7, further comprising:
program instructions, stored on the one or more computer readable storage media, to receive a second set of monitored usage information for the one or more processors executing the one or more threads, subsequent to adjusting the prefetch settings for the one or more threads;
program instructions, stored on the one or more computer readable storage media, to determine that the adjusted prefetch settings have a negative effect on the one or more processors executing the one or more threads, based on the second set of monitored usage information; and
program instructions, stored on the one or more computer readable storage media, to adjust the prefetch settings for the one or more threads to a previous setting.

11. The computer program product of claim 7, further comprising:
program instructions, stored on the one or more computer readable storage media, to determine that memory bandwidth is saturated for the one or more processors executing the one or more threads, based on the first set of monitored usage information.

12. The computer program product of claim 7, further comprising:
program instructions, stored on the one or more computer readable storage media, to receive a second set of monitored usage information for the one or more processors executing the one or more threads, subsequent to adjusting the prefetch settings for the one or more threads; and
program instructions, stored on the one or more computer readable storage media, to determine that the adjusted prefetch settings do not have a negative effect on the one or more processors executing the one or more threads, based on the second set of monitored usage information.

13. A computer system for sharing memory bandwidth in one or more processors, the computer system comprising:
one or more computer processors, one or more computer readable storage media, and program instructions stored on the computer readable storage media for execution by at least one of the one or more processors, the program instructions comprising:
program instructions to receive a first set of monitored usage information for one or more processors executing one or more threads, wherein the first set of monitored usage information comprises at least, for each thread of the one or more threads, instructions completed per cycle when prefetch is enabled, instructions completed per cycle when prefetch is disabled, memory bandwidth consumption when prefetch is enabled, and memory bandwidth consumption when prefetch is disabled;
program instructions to calculate impact of hardware data prefetching for each thread of the one or more threads, based on the first set of monitored usage information; and
program instructions to adjust prefetch settings for the one or more threads, based on the calculated impact of hardware data prefetching for each thread of the one or more threads.

14. The computer system of claim 13, wherein the first set of monitored usage information comprises at least, for each thread of the one or more threads, prefetch requests generated and prefetched data utilized; and
wherein program instructions to calculate the impact of hardware data prefetching for each thread of the one or more threads are based on at least prefetch requests generated and prefetched data utilized.

15. The computer system of claim 13, further comprising:
program instructions, stored on the computer readable storage media for execution by at least one of the one or more processors, to, prior to receiving the first set of monitored usage information, adjust the prefetch settings for the one or more threads to maximize prefetching for each thread of the one or more threads.

16. The computer system of claim 13, further comprising:
program instructions, stored on the computer readable storage media for execution by at least one of the one or more processors, to receive a second set of monitored usage information for the one or more processors executing the one or more threads, subsequent to adjusting the prefetch settings for the one or more threads;
program instructions, stored on the computer readable storage media for execution by at least one of the one or more processors, to determine that the adjusted prefetch settings have a negative effect on the one or more processors executing the one or more threads, based on the second set of monitored usage information; and
program instructions, stored on the computer readable storage media for execution by at least one of the one or more processors, to adjust the prefetch settings for the one or more threads to a previous setting.

17. The computer system of claim 13, further comprising:
program instructions, stored on the computer readable storage media for execution by at least one of the one or more processors, to determine that memory bandwidth is saturated for the one or more processors executing the one or more threads, based on the first set of monitored usage information.

* * * * *